Figure 1:
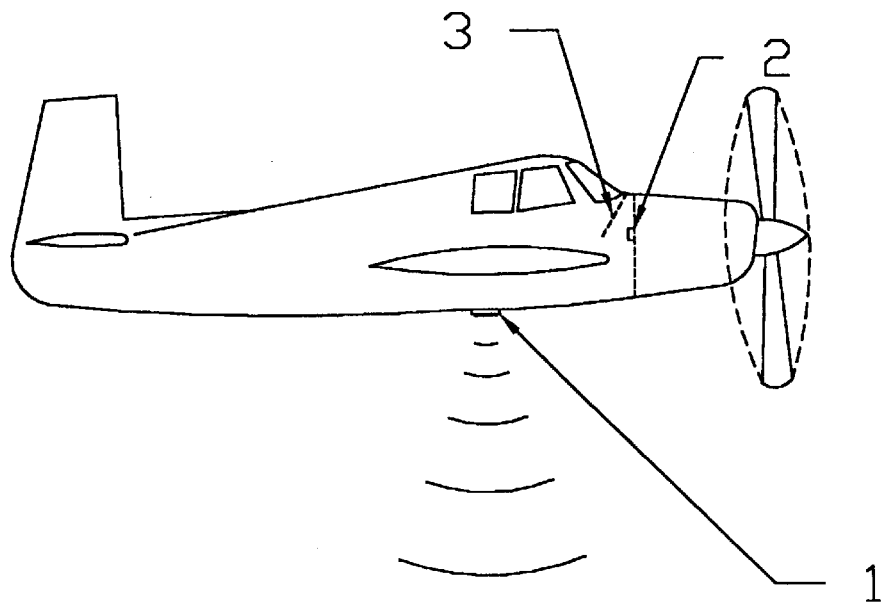

United States Patent [19]
Groves

[11] Patent Number: 6,008,742
[45] Date of Patent: *Dec. 28, 1999

[54] AIRCRAFT LANDING GEAR WARNING SYSTEM

[76] Inventor: Duane Groves, 3036 Eagle Bend Rd., Springhill, Fla. 34606

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,727

[22] Filed: May 21, 1997

[51] Int. Cl.[6] .................................................. G08B 21/00
[52] U.S. Cl. ..................... 340/960; 73/178 T; 340/945; 340/963; 340/970
[58] Field of Search .................................... 340/970, 977, 340/960, 945, 963; 73/178 T; 701/3, 14, 16, 4; 342/29, 65

[56] References Cited

U.S. PATENT DOCUMENTS

| | | |
|---|---|---|
| 3,860,925 | 1/1975 | Darboven, Jr. . |
| 3,946,358 | 3/1976 | Bateman ................................. 340/970 |
| 4,041,341 | 8/1977 | Hart ....................................... 340/970 |
| 4,516,124 | 5/1985 | Shannon et al. ....................... 340/960 |
| 4,792,904 | 12/1988 | Reinagel et al. ...................... 340/953 |
| 4,806,935 | 2/1989 | Fosket et al. ......................... 342/120 |
| 4,916,447 | 4/1990 | Vermilion et al. .................... 340/970 |
| 5,745,053 | 4/1998 | Fleming, III .......................... 340/970 |

OTHER PUBLICATIONS

Pioneer Brochure, Mar. 5, 1940, cl. 340–960.

*Primary Examiner*—Brent A. Swarthout

[57] ABSTRACT

The Aircraft Landing Gear Warning System is an electronic device designed for general aviation aircraft having retractable landing gear. The unit attaches to the aircraft. The system incorporates means of determining the aircraft's proximity to the ground and the status of the landing gear. If the device determines that the aircraft has descended to approximately 100 ft. above the ground and the wheels are retracted, the device provides a visual and audible warning to the pilot.

4 Claims, 1 Drawing Sheet

AIRCRAFT LANDING GEAR WARNING SYSTEM

I. BACKGROUND OF THE INVENTION

This invention is an electronic device designed for use on aircraft having retractable landing gear. If the aircraft is in close proximity to the ground and the landing gear is still retracted, the system provides a warning to the pilot. Although intended primarily for use on general aviation aircraft, it is not restricted to that application.

Historically, one of the major causes of aircraft accidents, and one of the largest causes of insurance claims, results from pilots landing their aircraft with the landing gear retracted.

Although some aircraft incorporate devices to warn the pilot that his landing gear is retracted, they require action on the part of the pilot to activate. Actions such as retarding the throttle to idle are required before the system will function. Also, these devices are not restricted to operation close to the ground. They can be activated by the pilot when the aircraft is at any altitude. For example, if the throttle on some aircraft is retarded while the aircraft is in flight at 10,000 ft., with the landing gear retracted, the landing gear warning will occur.

II. SUMMARY OF THE INVENTION

This invention offers significant improvements over existing technology and results in additional benefits and improved safety to the pilot and aircraft passengers. This invention is a completely passive device. It does not require any action by the pilot to initiate activation of the warning device. The warning device incorporates means to determine the proximity of the aircraft relative to the ground and means to determine the position of the aircraft landing gear. Activation occurs automatically when the aircraft is descending for landing.

III. DESCRIPTION OF DRAWINGS

FIG. 1 shows the three components which make up the system and their location on the aircraft.

IV. DETAILED DESCRIPTION OF THE INVENTION

The invention consists of three major components.
a) A transducer unit—1—which attaches to the under surface of the aircraft.
b) An electronic module—2—which mounts inside the aircraft.
c) A combination switch and light—3—which mounts on the instrument panel in front of the pilot.

The transducer unit incorporates a means to sense the ground presence. Such means having a limited activation distance. This means could be any type of device which emits electro-magnetic energy which is in turn reflected from the surface of the ground, or electronically interacts with the ground. Examples of such energy could be continuous microwave signals, infrared energy, etc. The preferred embodiment utilizes a continuous radiated Doppler microwave signal. This microwave signal is continuously radiated downward from the transducer. When the signal strikes a surface, a portion of the radiated energy is reflected back to the transducer. The transducer also incorporates a receiving device which reacts to this reflected signal. An amplifier and signal conditioning electronics are utilized to enhance this reflected signal.

The electronic module contains the means to analyze the electronic signals produced by the transducer unit, and the means to determine if the aircraft landing gear is retracted or extended. If the electronic module determines that the aircraft is in close proximity to the ground, and the wheels are retracted, the system will provide a warning to the pilot. The preferred embodiment utilizes a microprocessor and custom developed software to analyze the signals produced by the transducer unit. When the electronic module determines that the aircraft is in close proximity to the ground, approximately 100 ft. to 200 ft. It then determines if the landing gear is retracted or extended. This is accomplished in the preferred embodiment by monitoring the status of the landing gear down indicator light which is built into most aircraft. General aviation aircraft incorporate a system of switches and lights which provide the pilot with a visual indication of the up or down position of the landing gear. If this were not available, it could be accomplished by the use of special switches installed specifically to determine the landing gear position.

If the invention determines that the aircraft is close to the ground, and the landing gear is still retracted, it produces a warning to the pilot. The warning can be in the form of an audible warning, a visual warning or both. The preferred embodiment employs both a human voice warning and a visual light warning. Warnings continue until the pilot either extends the landing gear, or climbs the aircraft more than 200 ft. above ground level.

The combination switch and light mounted on the instrument panel functions to provide the visual warning. Pushing the switch momentarily causes the device to perform a self-test sequence.

I claim the following:

1. An electronic system apparatus for an aircraft having retractable landing gear which provides a warning, if a landing is attempted with the landing gear in the retracted position, said system comprising:

a) a transducer which detects or senses the presence of the ground through the emission of electro-magnetic energy signals which reflect from or electronically interact with the earth's surface;

b) a means for electronically processing signals returned to the transducer from the earth's surface to sense the presence of the ground, but not determine the actual altitude of the aircraft;

the reception of a returned signal at the transducer indicating a ground presence detection condition;

c) a means for determining the position of the landing gear; and d) means for providing an aural and or visual warning to a pilot if ground presence is detected by the means for electronically processing signals and the means for determining position of the landing gear determines that landing gear is retracted.

2. The apparatus in claim 1 wherein the transducer unit employs a continuously emitted Dopler microwave signal.

3. An apparatus in claim 1 wherein the transducer unit employs a laser beam and receiver.

4. An apparatus in claim 1 wherein the system provides an aural and or visual warning when ground presence is detected for both the landing gear up and the landing gear down positions.

* * * * *